(12) United States Patent
Drinkard et al.

(10) Patent No.: US 9,328,400 B2
(45) Date of Patent: May 3, 2016

(54) TREATMENT OF MANGANESE-CONTAINING MATERIALS

(71) Applicant: DRINKARD RESEARCH AND DEVELOPMENT CORPORATION, Charlotte, NC (US)

(72) Inventors: William F. Drinkard, Charlotte, NC (US); Hans J. Woerner, Charlotte, NC (US); William M. Nixon, Charlotte, NC (US)

(73) Assignee: DEEPGREEN ENGINEERING, PTE. LTD., Singapore (SG)

( * ) Notice: Subject to any disclaimer, the term of this patent is extended or adjusted under 35 U.S.C. 154(b) by 0 days.

(21) Appl. No.: 14/396,647

(22) PCT Filed: Aug. 6, 2013

(86) PCT No.: PCT/US2013/053736
§ 371 (c)(1),
(2) Date: Oct. 23, 2014

(87) PCT Pub. No.: WO2014/025744
PCT Pub. Date: Feb. 13, 2014

(65) Prior Publication Data
US 2015/0152524 A1 Jun. 4, 2015

Related U.S. Application Data

(60) Provisional application No. 61/681,193, filed on Aug. 9, 2012.

(51) Int. Cl.
*C22B 47/00* (2006.01)
*C05C 5/00* (2006.01)
*C22B 3/44* (2006.01)
*C22B 7/00* (2006.01)

(52) U.S. Cl.
CPC ............... *C22B 47/0081* (2013.01); *C05C 5/00* (2013.01); *C22B 3/44* (2013.01); *C22B 7/007* (2013.01); *C22B 47/00* (2013.01); *C22B 47/0063* (2013.01)

(58) Field of Classification Search
None
See application file for complete search history.

(56) References Cited

U.S. PATENT DOCUMENTS 4,123,499 A * 10/1978 Welsh et al. .................... 423/35
2010/0126313 A1* 5/2010 Drinkarc et al. ............... 75/743

* cited by examiner

*Primary Examiner* — Melissa Swain
(74) *Attorney, Agent, or Firm* — Ralph H. Dougherty

(57) ABSTRACT

An improved method for treating manganese-containing materials, such as seafloor manganese nodules, by leaching such materials with aqueous $HNO_3$ and polymerized nitric oxide $(N_2O_3)_x$, and more particularly to methods for recovering valuable constituents from such nodules, especially manganese, cobalt, nickel, iron, and copper. It also provides a method to leach manganese-containing material to release any titanium, vanadium, cerium, molybdenum and other metals from the manganese oxides and to make them available to be recovered, as well as providing a method of producing a fertilizer grade nitrate product.

30 Claims, 2 Drawing Sheets

TREATMENT OF MANGANESE-CONTAINING MATERIALS

CROSS REFERENCE TO RELATED APPLICATION

This application claims the benefit of priority of PCT Application PCT/US13/53736, filed Aug. 6, 2013, and U.S. Provisional Patent Application Ser. No. 61/681,193, filed Aug. 9, 2012.

FIELD OF THE INVENTION

The present invention relates to a method for treating manganese-containing materials, such as oxides, carbonates, minerals and ores. The invention is well suited to treating manganese-bearing industrial material such as manganese bearing batteries as well as manganese-containing nodules recovered from the seafloor or lake floor. The invention relates particularly to methods for leaching and recovering valuable constituents from such materials, especially manganese, and, if present, cobalt, nickel, copper, and/or iron.

BACKGROUND OF THE INVENTION

Manganese-containing material treated by the invention can include manganese dioxide bearing batteries such as zinc-carbon, alkaline, and lithium (LMO or $LiMn_2O_4$) batteries, and manganese minerals, including ores, or nodules.

Polymetallic or manganese nodules from the seafloor are rock concretions formed of concentric layers of iron and manganese hydroxides around a core.

Seafloor manganese nodules include in their composition, at least Mn and usually Ni, Co, Cu, Zn, and Fe, with minor amounts of titanium, vanadium, molybdenum, and cerium. Often present in addition are one or more of the following metals: magnesium, aluminum, calcium, cadmium, potassium, sodium, zirconium, titanium, lead, phosphorus, and barium.

All of the desired valuable metals in manganese nodules are tied up with insoluble oxidized manganese, such as $MnO_2$. Only about 9% of the manganese contained in the nodules is acid soluble. Thus it is necessary to reduce the $MnO_2$ by a suitable reducing agent as a first step in order to recover the metal constituents. Historically, $SO_2$ has been used for this purpose. However such prior art processes often do not recover a suitable manganese product and are capable of recovering only from about 80 to about 92% of the primary metal values, and often produce large quantities of waste. Lead is not soluble in sulfates or chlorides, thus reduction of compounds containing lead requires large sized equipment with the attendant high capital cost.

SUMMARY OF THE INVENTION

The present invention is a process for recovering manganese, and if present, other metal values from manganese-containing material having at least 5% manganese, including deep sea manganese nodules, by treating manganese-containing material with polymerized nitric oxide $(N_2O_3)_x$ in an aqueous solution. The polymerized nitric oxide $(N_2O_3)_x$ reacts with the $MnO_2$ as follows:

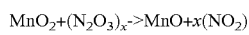

$$MnO_2 + (N_2O_3)_x \rightarrow MnO + x(NO_2)$$

MnO is then reacted with nitric acid to form $Mn(NO_3)_2$, liberating the trapped desired valuable metals.

OBJECTS OF THE INVENTION

The principal object of the present invention is to provide an improved method of recovering manganese from manganese-bearing materials.

Another object of the invention is to provide an effective leach for recovering metal values from manganese-bearing materials, including, if present, nickel, cobalt, zinc, copper, magnesium, aluminum, iron, calcium, cadmium, potassium, sodium, zirconium, titanium, lead, cerium, molybdenum, phosphorus, barium, and vanadium.

Another object of the invention is to provide an effective method of recovering metal values from undersea manganese-containing materials including seafloor or deepsea manganese nodules.

A further object of the invention is to produce a fertilizer grade nitrate material.

BRIEF DESCRIPTION OF THE DRAWINGS

The foregoing and other objects will become more readily apparent by referring to the following detailed description and the appended drawings, in which.

DETAILED DESCRIPTION

Figure 1:
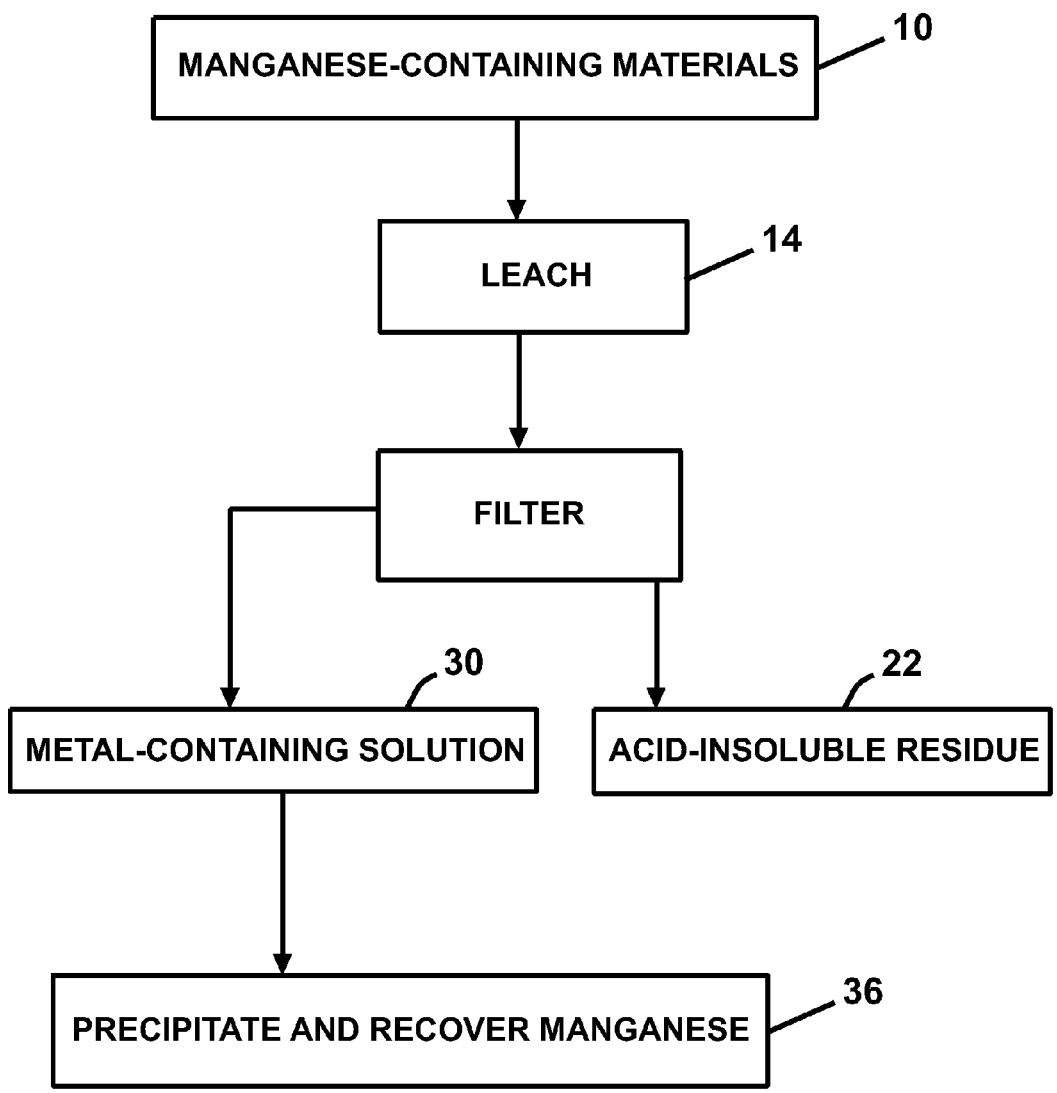
FIG. 1 is a schematic flowsheet of the invented process showing its most basic steps.
Figure 2:
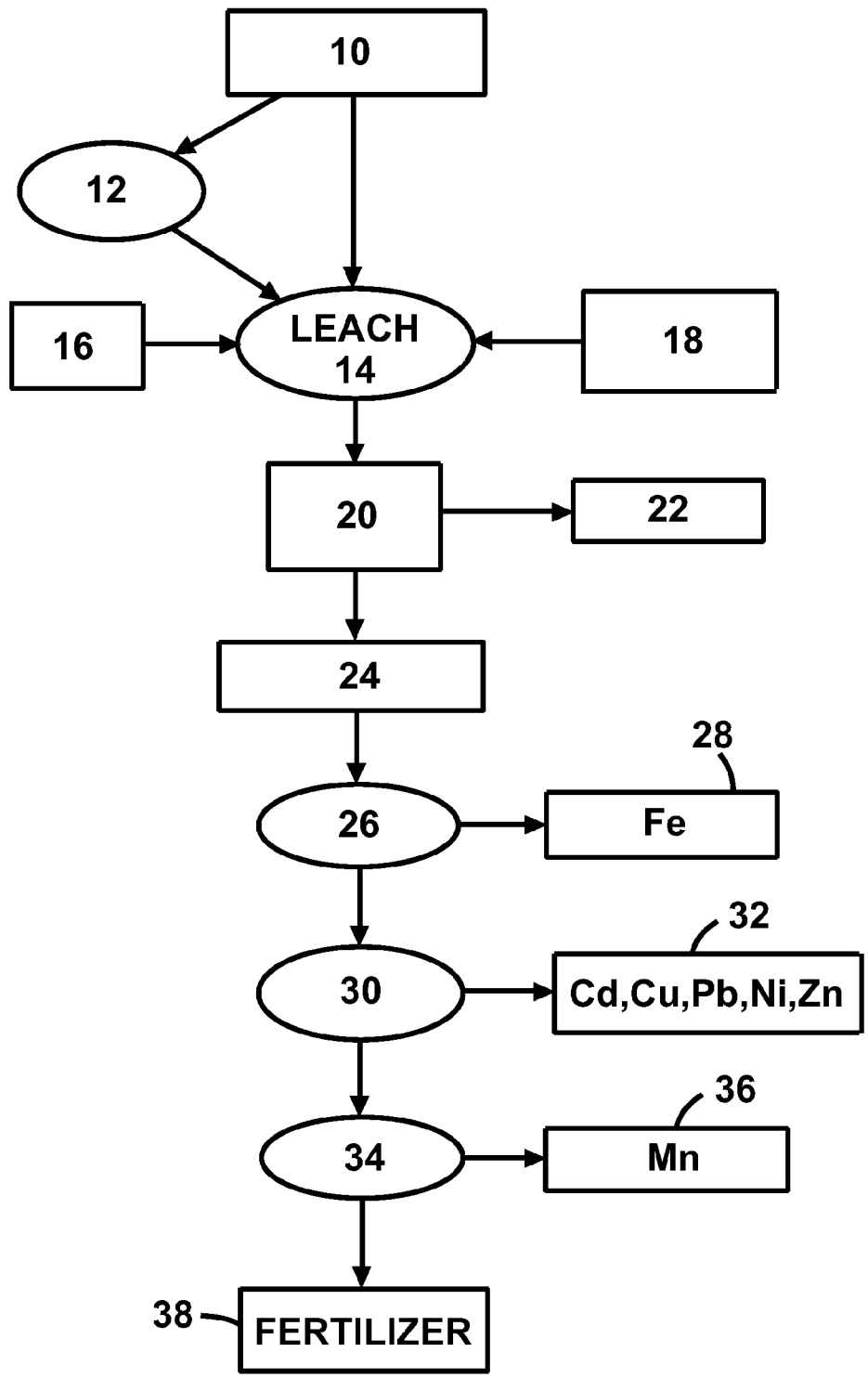
FIG. 2 is a schematic flowsheet of the process depicting a preferred embodiment.

The process begins with manganese-containing material 10 having a manganese content in excess of 5%, such as deepsea manganese nodules, which may be obtained from an ocean, sea, or other body of water. Sometimes such nodules are found in large lakes. Deep sea nodules often contain in excess of 20 percent manganese, usually about 28 percent.

In addition to manganese, such deep sea nodules usually contain at least one of the following metals: nickel, cobalt, zinc, copper, magnesium, aluminum, iron, calcium, cadmium, potassium, sodium, zirconium, titanium, lead, cerium, molybdenum, phosphorus, barium, and vanadium. The manganese-containing materials are selected from the group comprising: oxides, carbonates, and ores. The invented process includes the efficient leaching and recovery of many of these metal values.

Optionally, the nodules are crushed or ground 12 to increase the surface area for leaching. Advantageously, any chlorides, such as from salt water, in the nodules are removed by any convenient method, such as washing, preferably with water. This step may be done before, during or after any crushing, but preferably after. Crushing or grinding the nodules can occur during leaching in a wet mill or wet crusher.

Preferably, the manganese-containing material 10, such as nodules, is leached 14 in an aqueous nitric acid solution into which polymerized nitric oxide $(N_2O_3)_x$ 16 is introduced. Alternatively, the polymerized nitric oxide $(N_2O_3)_x$ first may be introduced into an aqueous solution containing nodules, followed by the introduction of $HNO_3$ 18 into the solution to complete the reaction.

The polymerized nitric oxide $(N_2O_3)_x$ reacts with $MnO_2$ to form MnO and $NO_2$, and to release the other metals from the nodules. This may be accompanied by or followed by heating 20 to complete the formation of metal nitrates. The solution is preferably heated to a temperature of from 30 to 150° C. to achieve the reaction. Since the reaction is exothermic, additional heat is applied only as necessary. Acid insolubles 22 are removed leaving a solution 24 containing manganese and other desirable metals.

The pH of the leachant solution is then changed at 26 to about 2.2-2.3 to precipitate hydrated iron oxide (FeOOH $H_2O$). The precipitated iron values 28 are removed by filtration of the solution. This pH change at 26 may be achieved in various ways, including the addition to the solution of ammonia or alkaline earth hydroxides, such as $Mg(OH)_2$ or $Ca(OH)_2$, or oxides or carbonates.

Once in solution 30, the metal values may be precipitated as oxides or sulfides. Any copper, lead, cadmium, nickel, and zinc present in the solution is removed therefrom. Preferably, the solution is adjusted to a low pH of 1.0 or less, followed by sulfide precipitation to precipitate, as sulfides, any copper, lead, cadmium, nickel and zinc which is present in the solution. The precipitated metal values 32 are then removed from solution 30 by filtration.

If desired, the pH of the solution is raised to the range of 3.0 to 4.0, followed by another sulfide precipitation, resulting in precipitating cobalt and nickel as sulfides. Aluminum and some remaining zinc may also be precipitated as sulfides in this step.

Preferably, the pH of the remaining solution 34 is then raised to about 9 to precipitate the manganese values. After filtering the residue to recover the manganese 36, the remaining nitrate solution 38 is a fertilizer grade product. The exact product depends on the pH adjustment agent used, which adjustment agent may be any alkaline source, such as ammonium, calcium, potassium or sodium compounds.

Alternative Embodiments

Alternatively, the manganese-containing starting material 10 can be derived from industrial waste or chemical processing, or from manganese ores from land mining operations.

Summary of the Achievement of the Objects of the Invention

From the foregoing, it is readily apparent that we have invented an improved method for treating manganese-containing material including the treatment of seafloor manganese nodules recovered by undersea mining to effectively leach the material to produce a manganese oxide product and release any valuable metals, and for recovering the metal values contained in the nodules more efficiently than heretofore has been possible. We have also invented an improved method of recovering manganese from manganese-bearing materials, including an effective leach for recovering metal values from manganese-bearing materials, as well as an effective method of recovering metal values from undersea manganese-containing materials including deepsea manganese nodules, and for producing a fertilizer grade nitrate material.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A method of recovering manganese from manganese-containing materials, comprising the following steps:
    a. obtaining manganese-containing materials having a manganese content of at least 5% by weight and containing other metals;
    b. leaching the manganese-containing materials with $HNO_3$ and polymerized nitric oxide $(N_2O_3)_x$ in an aqueous solution to form MnO and to release the other metals, and to form an acid-insoluble residue;
    c. filtering the acid-insoluble residue from the aqueous solution leaving desired metal values in the aqueous solution; and
    d. precipitating and recovering manganese.

2. A method according to claim 1, further comprising heating the aqueous solution during or following the leaching step to form and release metal nitrates.

3. A method according to claim 2 wherein heating of the aqueous solution comprises raising the aqueous solution temperature into a range of to 30 to 150° C.

4. A method according to claim 1 wherein the manganese-containing materials are leached in an aqueous nitric acid solution into which polymerized nitric oxide is then introduced.

5. A method according to claim 1 wherein the polymerized nitric oxide is introduced into the aqueous solution followed by addition of the $HNO_3$ to complete the leaching reaction.

6. A method according to claim 1 wherein the manganese-containing material contains at least one element from the group consisting of: nickel, cobalt, copper, magnesium, aluminum, iron, calcium, cadmium, potassium, sodium, zirconium, titanium, zinc, lead, cerium, molybdenum, phosphorus, barium, and vanadium.

7. A method according to claim 1 wherein the manganese-containing materials are manganese nodules obtained from any body of water, including a seafloor or lake floor.

8. A method according to claim 7, further comprising removing chlorides from the nodules prior to leaching.

9. A method according to claim 1 wherein the manganese-containing materials are derived from batteries, including alkaline and lithium-manganese batteries.

10. A method according to claim 1 wherein the manganese-containing material are derived from industrial waste or chemical processing.

11. A method according to claim 1 wherein the manganese-containing material are ores from land mining containing manganese or material from processing such ores.

12. A method according to claim 1 wherein the manganese-containing materials are selected from the group comprising: oxides, carbonates, and ores.

13. A method according to claim 7, further comprising crushing or grinding the nodules prior to leaching.

14. A method according to claim 7, further comprising crushing or grinding the nodules during leaching in a wet mill or wet crusher.

15. A method according to claim 8, wherein the chlorides are removed by washing the materials.

16. A method according to claim 15, wherein the chlorides are removed by washing the materials prior to leaching while crushing or grinding the nodules in a wet mill or wet crusher.

17. A method according to claim 7 wherein the nodules are leached in an aqueous solution into which polymerized nitric oxide $(N_2O_3)_x$ is introduced and then the nitric acid is introduced.

18. A method according to claim 1 wherein following leaching, the pH of the aqueous solution is changed to about 2.2-2.3 to precipitate hydrated iron oxide.

19. A method according to claim 18 wherein the pH of the aqueous solution is changed by adding ammonia or alkaline earth hydroxides, oxides, or carbonates to the aqueous solution.

20. A method according to claim 19 wherein the alkaline earth hydroxides are $Mg(OH)_2$ or $Ca(OH)_2$.

21. A method according to claim 18 wherein the precipitated hydrated iron oxide is filtered from the aqueous solution.

22. A method according to claim 1 where any copper, lead, cadmium, and any zinc present in the aqueous solution are removed by precipitation and filtration.

23. A method according to claim 22 where precipitation is effected by adjusting the aqueous solution to a low pH, followed by sulfide precipitation of the aqueous solution to precipitate, as sulfides, any copper, lead, cadmium, and zinc which is present in the aqueous solution, then removing precipitated metal values by filtration.

24. A method according to claim 1 where any cobalt and nickel is precipitated and removed.

25. A method according to claim 24, wherein precipitation of cobalt and nickel sulfides is carried out by raising the pH of the aqueous solution and introducing a sulfide to the solution, said sulfide being selected from the group consisting of: ammonium sulfide, calcium sulfide, potassium sulfide, or sodium sulfide.

26. A method according to claim 25 wherein some aluminum and zinc are precipitated in the cobalt-nickel precipitation step.

27. A method according to claim 1, wherein precipitation of manganese is carried out by raising the solution pH to about 9.

28. A method of producing a fertilizer grade nitrate product from manganese-containing materials, comprising the following steps:
  a. obtaining manganese-containing materials having a manganese content of at least 5% by weight and containing other metals;
  b. leaching the manganese-containing materials with an aqueous solution of $HNO_3$ and polymerized nitric oxide $(N_2O_3)_x$ to form MnO and to relese the other metals and to form an acid-insoluble residue;
  c. filtering the acid-insoluble residue from the aqueous solution leaving desired metal values in the aqueous solution, and
  d. precipitating and recovering manganese, leaving an aqueous solution which is a fertilizer-grade nitrate product.

29. A method according to claim 28, further comprising heating the solution during or following the leaching step to form and release metal nitrates.

30. A method according to claim 28 wherein the manganese-containing materials are leached in an aqueous nitric acid solution into which polymerized nitric-oxide is then introduced.

* * * * *